United States Patent [19]
Gadkaree

[11] Patent Number: 6,156,697
[45] Date of Patent: Dec. 5, 2000

[54] METHOD OF PRODUCING HIGH SURFACE AREA CARBON STRUCTURES

[75] Inventor: Kishor P. Gadkaree, Big Flats, N.Y.

[73] Assignee: Corning Incorporated, Corning, N.Y.

[21] Appl. No.: 09/172,727

[22] Filed: Oct. 13, 1998

Related U.S. Application Data

[60] Provisional application No. 60/064,168, Nov. 4, 1997.

[51] Int. Cl.$^7$ ...................................................... B01J 20/20
[52] U.S. Cl. .............................................................. 502/427
[58] Field of Search ................................... 428/116, 117, 428/367, 368, 408; 502/423, 427

[56] References Cited

U.S. PATENT DOCUMENTS

| | | | |
|---|---|---|---|
| 3,885,977 | 5/1975 | Lachman et al. | 501/80 |
| 4,127,691 | 11/1978 | Frost | 428/116 |
| 4,564,702 | 1/1986 | Wennerberg | 562/493 |
| 4,758,272 | 7/1988 | Pierotti et al. | 75/246 |
| 4,992,233 | 2/1991 | Swaroop et al. | 419/2 |
| 5,427,601 | 6/1995 | Harada et al. | 75/235 |
| 5,451,444 | 9/1995 | DeLiso et al. | 428/116 |
| 5,488,023 | 1/1996 | Gadkaree et al. | 502/182 |
| 5,820,967 | 10/1998 | Gadkaree | 428/116 |

*Primary Examiner*—Tom Dunn
*Assistant Examiner*—Stuart L. Hendrickson
*Attorney, Agent, or Firm*—L. Rita Herzfeld; Anca C. Gheorghiu

[57] ABSTRACT

A method of producing a continuous carbon structure involves providing an inorganic support and a synthetic carbon precursor, contacting the inorganic support with the carbon precursor, curing and carbonizing the carbon precursor. Prior to the carbonizing step, a potassium compound is introduced into the carbon precursor. The potassium compound is greater than about 3% by weight of the total weight of the carbon precursor and potassium compound.

The potassium compound is then removed from the carbonized carbon structure. A carbon structure is produced having a surface area of at least about 100 $m^2/g$.

21 Claims, No Drawings

METHOD OF PRODUCING HIGH SURFACE AREA CARBON STRUCTURES

This application claims the benefit of U.S. Provisional Application Ser. No. 60/064,168, filed Nov. 4, 1997, entitled "Method of Producing High Surface Area (carbon Structures", by Kishor P. Gadkaree.

This invention relates to a method of producing a continuous high surface area synthetic carbon structure in which there is a minimum of oxidation.

BACKGROUND OF THE INVENTION

High surface area activated carbon has been made from carbon precursors such as synthetic resins e.g. phenolics and polyfurfuryl alcohol. Monolithic activated carbon structures can be made by first forming a structure from a precursor resin and then carbonizing and activating the structure. These structures are structurally superior to structures made from particulate activated carbon. For example, structures made by the above-described method are continuous activated carbon structures as opposed to discontinuous activated carbon derived from particulate activated carbon. This property affords better uniformity and strength of the activated carbon structure.

Typically a resin, after being shaped into a form, is cured first at relatively low temperature (<200° C.) where crosslinking takes place. The cured resin structure is then heat treated in an inert atmosphere to 600–1100° C. to carbonize the resin. During carbonization, cross links are destroyed and low molecular weight organic compounds are removed with a resulting weight loss of about 50% for these high carbon yield resins. The remaining carbon is a mixture of amorphous and crystalline carbon. To create porosity in the carbon for adsorption, the amorphous carbon is preferentially removed by oxidation with carbon dioxide or steam. The pores with pore diameters smaller than 3–4 nanometers cause adsorption of various species on the carbon surface. These carbons are excellent adsorbers.

At present, activated carbon structures such as honeycombs are fabricated for various applications. One disadvantage of these structures is that because of the activation conditions, i.e., oxidation at high temperatures, the carbon surface has a high oxygen concentration. High oxygen concentration is not desirable in applications such as water purification, batteries, etc. However, if the carbon is not activated, the resulting low porosity carbon with low surface area cannot be optimally used in these applications.

Therefore a need exists to produce continuous high surface area carbon with low oxygen concentration.

The present invention provides such as method.

SUMMARY OF THE INVENTION

In accordance with one aspect of the invention, there is provided a method of producing a continuous carbon structure involves providing an inorganic support and a synthetic carbon precursor, contacting the inorganic support with the carbon precursor, curing and carbonizing the carbon precursor. Prior to the carbonizing step, a potassium compound is introduced into the carbon precursor. The potassium compound is greater than about 3% by weight of the total weight of the carbon precursor and potassium compound.

The potassium compound is then removed from the carbonized carbon structure. A carbon structure is produced having a surface area of at least about 100 m$^2$/g.

DETAILED DESCRIPTION OF THE INVENTION

The present invention provides a method of making high surface area activated carbon from a carbon precursor without oxidation at high temperature. The carbon is most typically supported on a support, in other words, a substrate. The method involves incorporating potassium compounds into the carbon precursor prior to carbonization, preferably prior to the curing and most preferably by being pre-mixed with the carbon precursor prior to curing. A relatively large quantity of potassium compounds can be introduced into the carbon precursors by dissolution without setting up the precursor.

The carbon precursor and support or substrate

By carbon precursor is meant a carbon-containing substance that converts to continuous structure carbon on heating. The carbon precursor can include any synthetic liquid or liquefiable carbonaceous substance. Examples of useful carbon precursors include crosslinkable resins such as thermosetting resins, thermoplastic resins (e.g., polyvinylidene, polyvinyl chloride, polyvinyl alcohol, and the like), furfuryl alcohol.

Low viscosity carbon precursors (e.g., thermoset resins) are preferred for greater penetration of the carbon precursor into the porosity of the substrate. Phenolic resins are most preferred due to their low viscosity, high carbon yield, high degree of cross-linking upon curing relative to other precursors, and low cost. Phenolic resins that are especially suited are phenolic resoles such as plyophen (No. 43290), supplied by Occidental Chemical Co., Niagara Falls, N.Y.

The carbon precursor used in the present method can include a single precursor material or a mixture of two or more precursor materials.

According to this invention, by activated carbon supported structure is meant that activated carbon is in contact with an inorganic material that supports it or gives it shape or strength. In a broad sense, the activated carbon can be thought of as a coating on the support or substrate. The resulting activated carbon coated support can take the form of powders, granules, or shapes such as pellets, or monoliths such as multicellular structures e.g. honeycombs. By monolith is meant a structure that functions in an application as a unitary or single body as opposed to multiple pieces that function in beds, such as granules, pellets, and powders. The activated carbon forms can be made by various techniques known in the art.

For example, activated carbon coated substrates in which the activated carbon is derived from a carbon precursor are described in U.S. Pat. No. 5,451,444 which is herein incorporated by reference.

An activated carbon coating derived from a carbon precursor extends over the outer surface of a porous substrate in the form of a substantially uninterrupted layer of carbon. This continuous carbon coating is anchored into the porosity and, as a result, is highly adherent. If interconnecting porosity is present in the substrate, an interlocking network of carbon will be formed within the composite, resulting in an even more adherent carbon coating. The uninterrupted carbon provides advantages of high activity despite a relatively low carbon content, high strength, and high use temperatures. This is in contrast to discontinuous coatings, derived from for example, a slurry of binder and activated carbon particles. In slurry-coated structures, activated carbon is bound to the binder which in turn is bound to the substrate. As a result, binder particles are necessarily interdispersed through the carbon coating, rendering it discontinuous.

In general, activated carbon bodies or coatings derived from carbon precursors have distinct advantages over bodies and coatings made from activated carbon. bodies made directly from activated carbon are made of discontinuous carbon which must be bound together by permanent binders; whereas resin-derived activated carbon bodies are made of continuous carbon and do not require permanent binders. This continuous carbon structure is strong and durable and can be used in high flow rate chemical processes. Such bodies also have durability in liquid streams. Bodies made from activated carbon particles are not durable in organic solvents and in many cases even in water, since the binder holding the stricture together is water soluble. Coatings made of activated carbon particles are not as uniform or adherent as those derived from carbon precursors, and are more subject to erosion.

It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

The substrate must have enough strength to function in the application and be capable of withstanding the heat-treating temperature experienced in forming the activated carbon coating.

In its most useful form, the substrate is a monolithic substrate. Typical monolithic substrates have means for passage of a fluid stream therethrough, e.g., a network of pores communicating from the outside to the inside, and/or through channels extending from one end of the monolith to the other for passage of the fluid stream into one end and out through the other end.

Suitable porous substrate materials include ceramic, glass ceramic, glass, metal, graphitic carbon, activated carbon, e.g activated carbon powder or particles, and combinations thereof. By combinations is meant physical or chemical combinations, eg., mixtures, compounds, or composites.

Some materials that are especially suited to the practice of the present invention, although it is to be understood that the invention is not limited to such, are those made of cordierite, mullite, clay, magnesia, and metal oxides, talc, zircon, zirconia, zirconates, zirconia-spinel, magnesium alumino-silicates, spinel, alumina, silica, silicates, borides, alumino-silicates, eg., porcelains, lithium aluminosilicates, alumina silica, feldspar, titania, fused silica, nitrides, borides, carbides, eg., silicon carbide, silicon nitride or mixtures of these. Cordierite is preferred because its coefficient of thermal expansion is comparable to that of carbon, increasing the stability of the activated carbon body. Some typical ceramic substrates are disclosed in U.S. Pat. Nos. 4,127,691 and 3,885,977. Those patents are herein incorporated by reference as filed.

Suitable metallic materials are any metal or alloy or intermetallic compound that provides durable structural service, and does not soften below about 600° C. Particularly useful are alloys which are predominantly of iron group metal (i.e. Fe, Ni, and Co), either with carbon (e.g. steels, especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders for forming substrates are disclosed in U.S. Pat. Nos. 4,992,233, 4,758,272, and 5,427,601 which are herein incorporated by reference as filed. U.S. Pat. Nos. 4,392,233 and 4,758,272 relate to methods of producing porous sintered bodies made from metal powder compositions of Fe and Al with optional additions of Sn, Cu, and Cr. U.S. Pat. No. 5,427,601 relates to porous sintered bodies hanging a composition consisting essentially of in percent by weight about 5 to 40 Cr, about 2 to 30 Al, 0 to about 5 of special metal, 0 to about 4 of rare earth oxide additive and the balance being iron group metal and unavoidable impurities, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanide, Zr, Hf, Ti, Si, and B, with optional additions of alkaline earths, Cu, and Sn.

Especially preferred materials are cordierite, mullite, zeolite, alumina, and combinations thereof.

The substrate is preferably a honeycomb or matrix of thin walls forming a multiplicity of open ended cells extending between the ends of the honeycomb.

Generally honeycomb cell densities range from 235 cells/$cm^2$ (about 1500 cells/$in^2$) to 1 cell/$cm^2$ (about 6 cells/$in^2$. Wall (web) thicknesses range typically from about 0.1 to about 1.5 mm. The external size and shape of the body is controlled by the application.

In another embodiment, coated monolithic substrates can be ground up to form granules.

The activated carbon can be in the form of a shaped monolith. This can be done by known methods of shaping mixtures of carbon precursor, binders and/or fillers that are at least inorganic, and forming aids, such as by extrusion. The inorganic fillers can be considered to be the supports or substrates for the activated carbon. Optionally, there can be organic fillers, but these would not be considered to be supports or substrates according to this invention.

Some fillers that are suited include both natural and synthetic, hydrophobic, and hydrophilic, fibrous and nonfibrous, carbonizable and non-carbonizable fillers.

Some inorganic fillers that can be used are oxygen-containing minerals such as clays, zeolites, talc, etc., carbonates, such as calcium carbonate, aluminosilicates such as kaolin (an aluminosilicate clay), flyash (an aluminosilicate ash obtained after coal firing in power plaits), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2–6 micrometers in diameter and about 20–50 micrometers in length.

For example some natural fillers are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat flour, wool fibers, corn, potato, rice, tapioca, coal powder, activated carbon powder, graphite etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

One especially suited carbonizable fiber filler is cellulose fiber as supplied by International Filler Corporation, North Tonawanda, N.Y. This material has the following sieve analysis: 1–2% on 40 mesh (420 micrometers), 90–95% thru 100 mesh (149 micrometers), and 55–60% thru 200 mesh (74 micrometer).

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

Some binders that can be used are plasticizing temporary organic binders such as cellulose ethers. Some typical cellulose ethers are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred.

Some binders and fillers that are especially suited are described in U.S. Pat. No. 5,820,967, filed May 20, 1996. That application is herein incorporated by reference.

Some forming e.g. extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder.

Other additives that are useful for improving the extrusion and curing characteristics of the batch are phosphoric acid and oil. Phosphoric acid improves the cure rate and increases adsorption capacity. It is typically about 0.1% to 5 wt. % in the mixture. The oil addition aids in extrusion and results in increase in surface area and porosity. Oil is added typically at about 0.1 to 5 wt. % (in the mixture.

The oil must be water immiscible, so that with liquid resins it can form a stable emulsion. With solid resin, a suspension is formed. Some useful oils are petroleum oils with molecular weights from about 250 to 1000, containing paraffinic and/or aromatic and/or alicyclic compounds. So called paraffinic oils composed primarily of paraffinic and alicyclic structures are preferred. These can contain additives such as rust inhibitors or oxidation inhibitors such as are commonly present in commercially available oils. Some useful oil are 3 in 1 oil from 3M Co., or 3 in 1 household oil from Reckitt and Coleman In., Wayne, N.J. Other useful oils are synthetic oils based on poly alpha olefins, esters, polyalkylene glycols, polybutenes, silicones, polyphenyl ether, CTFE oils, and other commercially available oils. Vegetable oils such as sunflower oil, sesame oil, peanut oil, etc. are also useful. Especially suited are oils having a viscosity of about 10 to 300 cps, and preferably about 10 to 150 cps.

The above ratios apply also to shaped activated carbon bodies. Generally the amount of activated carbon in the shaped body is about 10 to 98 wt %.

The potassium compounds

Some examples of useful potassium compounds are potassium hydroxide, potassium acetate, potassium carbonate, potassium halides e.g. potassium chloride, potassium sulfate, and/or potassium nitrate. Potassium hydroxide is especially useful.

The potassium compound is present in the potassium compound-carbon precursor at a level of greater than about 3% by weight, preferably about 4% to 50%, and more preferably about 15% to 40%, by weight.

Generally the potassium compound can be introduced into the carbon precursor at any point prior to the carbonization. However, for best adsorption efficiency, it is preferred that the potassium compound be introduced into the carbon precursor before cure and that it be premixed with the carbon precursor before cure. In this way, the carbon precursor and the potassium salt can be coated onto a monolith, or be mixed with inorganic and other support material and shaped as previously described.

To introduce the potassium compounds after cure, the cured carbon precursor such as in the shape of a monolith, is dipped in a concentrated solution of the potassium compound in a solvent for several hours. The carbon precursor is then removed, washed repeatedly with water, and dried.

Typically acids or basic salts of alkali metals are used as curing agents for the carbon precursors at about 1–3 wt % levels. The precursor cures at relatively low temperatures (100–150° C.) with these levels of potassium compounds. At high levels of the curing agents, the precursor begins to set up even at room temperature making it impossible to apply to a support. It has been found that potassium compounds can be introduced into the carbon precursor at higher levels as set forth in this invention, without starting the curing process. Precautions have to be taken to ensure that the mixture is cooled during the mixing process to avoid heat build-up.

After the desired amount of potassium compound is combined with the carbon precursor, the combination is then dried slowly and cured at 120–180° C. e.g. about 150° C. The combination cures into a solid mass. The combination is then carbonized in inert atmosphere at about 600–1100° C.

The carbonized product is then washed with water to remove the potassium compounds. The washing is continued until the pH of the wash water is neutral. The removal of the potassium leaves porosity behind. With the method of this invention, the carbon does not have to be subjected to the usual separate activation step under oxidizing conditions to obtain high surface area carbon. The surface area of the carbon structure of this invention is at least about 100 $m^2/g$, and more typically at least about 200 $m^2/g$.

The surface concentration of oxygen has been found to decline to about 6–10% compared to 23–25% oxygen on carbon made via activation with carbon dioxide.

Advantages of this process include uniform adsorption capacity for large structures, which is difficult to attain with carbon dioxide-activated structures because of nonuniformity of gas distribution and temperature gradients; shorter high temperature cycles resulting in increasing process throughput; and elimination of the need for carbon dioxide or steam activation at high temperatures.

To more fully illustrate the invention, the following non-limiting examples are presented. All parts, portions, and percentages are on a weight basis unless otherwise stated.

EXAMPLE 1

Potassium hydroxide was mixed with phenolic resole resin from Georgia Pacific (viscosity about 140 cps) to form a solution containing about 7.5% KOH. The solution was then coated onto a cordierite honeycomb having 62 cells/ $cm^2$ (400 cells/$in^2$) and a wall thickness of about 0.3 mm and a porosity of about 49%. The coated honeycomb was then dried at about 85–90° C. and cured at about 125–150° C. After cure, the honeycomb was heated in nitrogen to about 800° C. and held at that temperature for about 5 hours. The honeycomb was then cooled to room temperature and washed in cold or warm water until all the potassium was removed as indicated by neutral pH of the wash water. The honeycomb was then subjected to an adsorption test in about 4000 cc/min 1500 ppm butane in nitrogen flow. The adsorption capacity of the honeycomb was about 60 mg of butane.

EXAMPLE 2

The procedure of Example 1 was carried out but with about 15% KOH in solution. The adsorption capacity in this case increased to about 102 mg which was an increase of about 67% over Example 1.

EXAMPLE 3

The procedure of Example 2 was repeated and the honeycomb after drying at about 90° C. was dipped again in the resin. The process was repeated to increase the amount of carbon on the honeycomb. The double coated honeycomb had an adsorption capacity of about 177 mg.

EXAMPLE 4

The procedure of Example 2 was repeated but with about 25% KOH solution. On single coating as in Example 2, the capacity was about 153 mg, which is about 50% higher than at 15% KOH solution.

It is clear from the above examples that adsorption capacities increase substantially with an increase in KOH content. Multiple coatings also increase the amount of carbon and so adsorption capacity.

It should be understood that while the present intention has been described in detail with respect to certain illustrative and specific embodiments thereof, it should not be considered limited to such but may be used in other ways without departing from the spirit of the invention and the scope of the appended claims.

What is claimed is:

1. A method of producing a structure consisting essentially of carbon and a support, the method comprising;
   a) providing an inorganic support and a synthetic carbon precursor;
   b) contacting the inorganic support with the carbon precursor;
   c) curing the carbon precursor;
   d) carbonizing the cured carbon precursor;
   wherein prior to the carbonizing step, a potassium compound is introduced into the carbon precursor, wherein the potassium compound is greater than about 3% by weight of the total weight of the carbon precursor and potassium compound; and
   e) washing and removing the potassium compound from the carbonized carbon structure to produce a continuous carbon having a surface area of at least about 100 $m^2/g$ and an oxygen surface concentration of about 6–10%.

2. A method of claim 1 wherein the potassium compound is about 4% to 50% by weight of the total weight of the carbon precursor and potassium compound.

3. A method of claim 2 wherein the potassium compound is about 15% to 40% by weight of the total weight of the carbon precursor and potassium compound.

4. A method of claim 1 wherein the potassium compound is introduced into the carbon precursor prior to the curing step.

5. A method of claim 4 wherein the potassium compound is pre-mixed with the carbon precursor prior to contacting the carbon precursor with the support.

6. A method of claim 4 wherein the contacting of the premixed potassium compound and carbon precursor with the support is repeated at least one additional time.

7. A method of claim 1 wherein the potassium compound is selected from the group consisting of potassium hydroxide, potassium acetate, potassium carbonate, potassium halides, potassium sulfate, potassium nitrate, and mixtures thereof.

8. A method of claim 7 wherein the potassium compound is potassium hydroxide.

9. A method of claim 1 wherein the carbon precursor is crosslinkable resin.

10. A method of claim 9 wherein the carbon precursor is a synthetic resin selected from the group consisting of phenolic resins, polyfurfuryl resins, and mixtures thereof.

11. A method of claim 10 wherein the carbon precursor is phenolic resin.

12. A method of claim 1 wherein the support is selected from the group consisting of ceramic, glass, glass ceramic, molecular sieve, metal, graphitic carbon, activated carbon, and mixtures thereof.

13. A method of claim 12 wherein the support is selected from the group consisting of cordierite, mullite, alumina, zeolite, and mixtures thereof.

14. A method of claim 1 wherein the support is in the form of a monolithic multicellular structure.

15. A method of claim 5 wherein the potassium compound is potassium hydroxide and the carbon precursor is a phenolic resin.

16. A method of claim 15 wherein the support is in the form of a monolithic multicellular structure.

17. A method of making a structure consisting essentially of carbon and a support, the method comprising;
   a) providing an inorganic support and a synthetic carbon precursor;
   b) contacting the inorganic support with the synthetic carbon precursor;
   c) curing the synthetic carbon precursor;
   d) carbonizing the cured carbon precursor to produce a continuous carbon structure, wherein prior to the carbonizing step the carbon precursor is mixed with a potassium compound selected from the group consisting of potassium hydroxide, potassium acetate, potassium carbonate, potassium halides, potassium sulfate, potassium nitrate, and mixtures thereof, wherein the potassium compound is added in an amount of between 15–40% by weight of the total weight of the synthetic carbon precursor and potassium compound;
   e) washing and removing the potassium compound from the carbonized carbon structure to produce a continuous carbon having a surface area of at least 100 $m^2/g$, and an oxygen surface concentration of about 6–10%.

18. The method of claim 17 wherein the continuous carbon structure has a surface area of at least about 200 $m^2/g$.

19. The method of claim 17 wherein the potassium compound is potassium hydroxide.

20. The method of claim 17 wherein the potassium compound is potassium hydroxide and the carbon precursor is a phenolic resin.

21. The method of claim 17 wherein the inorganic support is a monolithic multicellular structure.

* * * * *